(12) United States Patent
Cohen et al.

(10) Patent No.: US 6,356,355 B1
(45) Date of Patent: Mar. 12, 2002

(54) METHOD AND APPARATUS IN A DATA PROCESSING SYSTEM FOR GENERATING METADATA STREAMS WITH PER PAGE DATA

(75) Inventors: Marc L. Cohen; Michael R. Cooper; Patrick Edward Nogay; Mark Wayne Vanderwiele, all of Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/164,127

(22) Filed: Sep. 30, 1998

(51) Int. Cl.[7] .............................................. G06K 15/00
(52) U.S. Cl. ....................................... 358/1.15; 358/1.1
(58) Field of Search ........................... 358/1.1, 1.2, 1.9, 358/1.15, 1.16, 1.17, 298, 404, 444, 518, 530, 1.11; 345/428; 707/511, 500, 513, 505, 527; 710/62, 65, 72, 70

(56) References Cited

U.S. PATENT DOCUMENTS

| | | | |
|---|---|---|---|
| 4,809,216 A | 2/1989 | Lai .............................. | 364/900 |
| 5,327,559 A | 7/1994 | Priven et al. ................ | 395/700 |
| 5,339,392 A | 8/1994 | Risberg et al. .............. | 395/161 |
| 5,497,491 A | 3/1996 | Mitchell et al. ............. | 395/700 |
| 5,530,864 A | 6/1996 | Matheny et al. ............ | 395/700 |
| 5,583,982 A | 12/1996 | Matheny et al. ............ | 395/326 |
| 5,602,974 A | 2/1997 | Shaw et al. .................. | 395/114 |
| 5,687,303 A | 11/1997 | Motamed et al. ........... | 395/117 |
| 5,978,560 A | * 11/1999 | Tan et al. .................... | 358/1.15 |
| 6,173,295 B1 | * 1/2001 | Goertz et al. ............... | 707/505 |

OTHER PUBLICATIONS

International Business Machines; Critical Page Caching in an External Memory Manager; Nov. 1995; IBM Technical Disclosure Bulletin vol. 38, No. 11.; pp. 187–190.

* cited by examiner

Primary Examiner—Arthur G. Evans
(74) Attorney, Agent, or Firm—Duke W. Yee; Jeffrey S. LaBaw

(57) ABSTRACT

A method and apparatus in a data processing system for generating a metadata stream. Calls are received calls from an application, wherein the calls are received calls. The current application attributes in the received calls are tracked. The received calls are monitored for a new page call. When a new page call is identified in the received calls, the new page call is placed within the metadata stream to identify a new page in the metadata stream. Current application attributes are placed in the metadata stream within the new page identified by the new page call, wherein the new page within the metadata stream may be outputted/printed or reprocessed using the current application attributes located within new page.

7 Claims, 7 Drawing Sheets

METHOD AND APPARATUS IN A DATA PROCESSING SYSTEM FOR GENERATING METADATA STREAMS WITH PER PAGE DATA

BACKGROUND OF THE INVENTION

CROSS-REFERENCE TO RELATED APPLICATION

The present invention is related to the following application entitled "Method and Apparatus for Compacting a Metadata Stream in a Data Processing System", Attorney Docket No. AT9-98-310, filed even date hereof, is incorporated herein by reference.

1. Technical Field

The present invention relates generally to an improved data processing system and in particular to a method and apparatus for processing a data stream. Still more particularly, the present invention provides a method and apparatus for reducing the size of a data stream.

2. Description of Related Art

Currently, metadata streams are a stream of application generated graphical function calls that may be printed by printer or display on a display device. Metadata is data about data. For example, the title, subject, author, and size of a file constitute metadata about a file. With respect to graphics, the current position, color, and size of a primitive, such as a box, constitute the metadata for the box.

Within a metadata stream, new frame calls are embedded to switch from one page to the next page. Currently, in order to print a specific page other than starting at the first page, the module or application performing the printing of the metadata stream has to start at page one and start recording all the attributes, also referred to as state information, up to the page that the user wants to be printed. This process becomes increasingly difficult in the case in which a user wants to print a document in reversal order or print every other page.

Therefore, it would be advantageous to have an improved method and apparatus for managing printing of a graphics data stream.

SUMMARY OF THE INVENTION

The present invention provides a method and apparatus in a data processing system for generating a metadata stream. Calls are received calls from an application, wherein the calls are received calls. The current application attributes in the received calls are tracked. The received calls are monitored for a new page call. When a new page call is identified in the received calls, the new page call is placed within the metadata stream to identify a new page in the metadata stream. Current application attributes are placed in the metadata stream within the new page identified by the new page call, wherein the new page within the metadata stream may be outputted/printed or reprocessed using the current application attributes located within new page.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
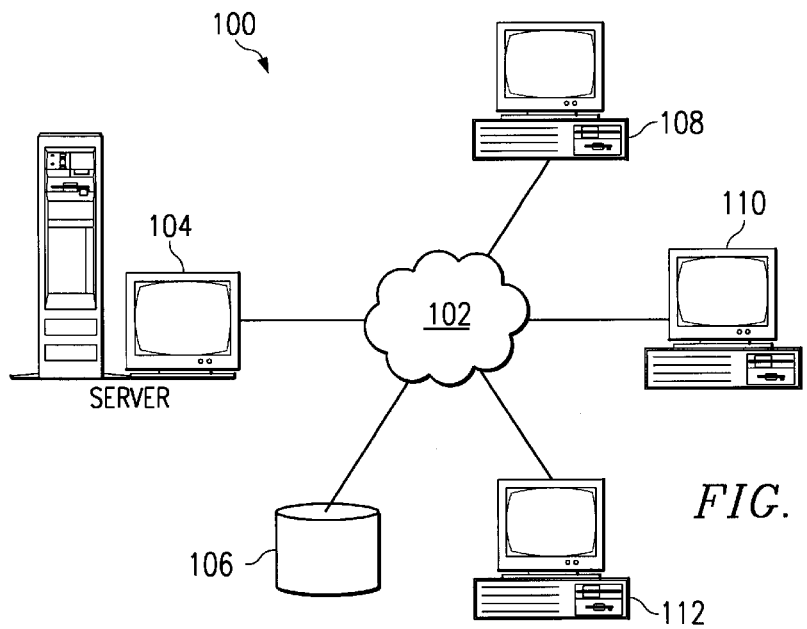
FIG. 1 is a pictorial representation of a distributed data processing system in which the present invention may be implemented.

With reference now to the figures, and in particular with reference to FIG. 1, a pictorial representation of a distributed data processing system in which the present invention may be implemented is depicted.

Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another.

At the heart of the Internet is a backbone of high-speed data communication lines between major nodes or host computers, consisting of thousands of commercial, government, educational, and other computer systems, that route data and messages. Of course, distributed data processing system 100 also may be implemented as an umber of different types of networks, such as for example, an intranet or a local area network.

FIG. 1 is intended as an example, and not as an architectural limitation for the processes of the present invention.

Figure 2:
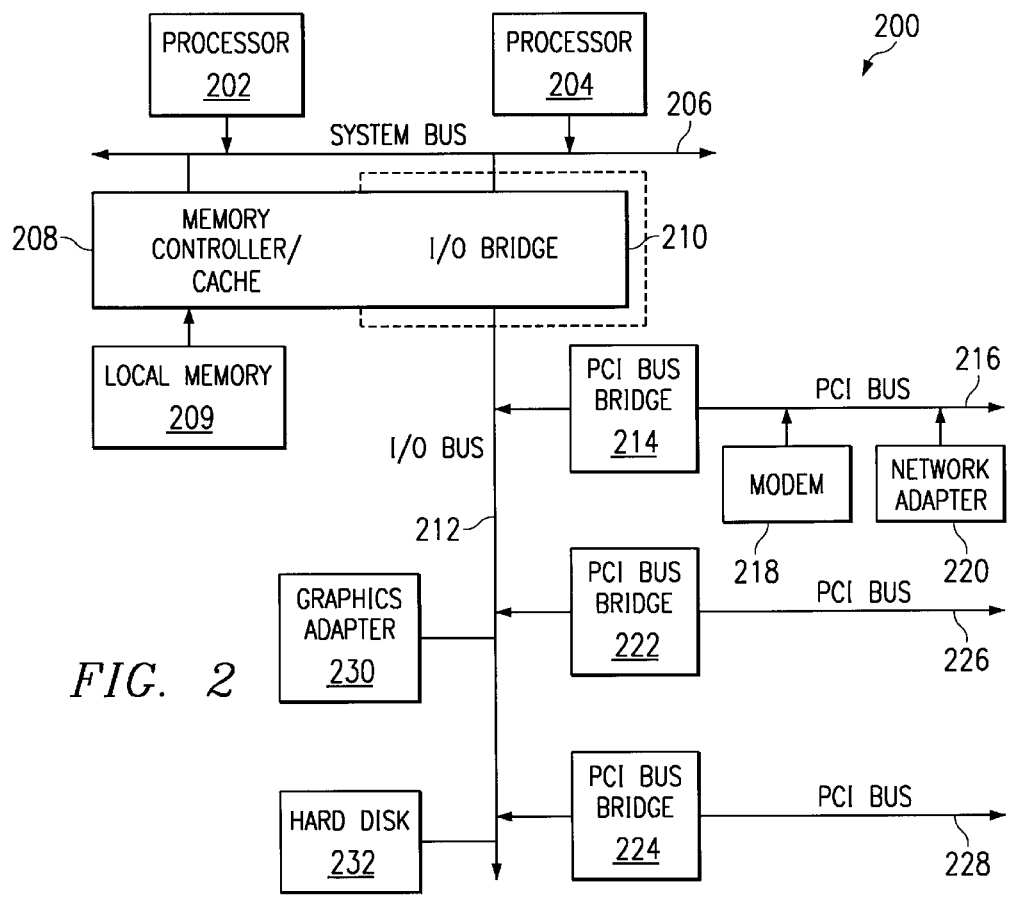
FIG. 2 is a block diagram of a data processing system which may be implemented as a server in accordance to the present invention.

Referring to FIG. 2, a block diagram of a data processing system which may be implemented as a server, such as server 104 in FIG. 1, is depicted in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drive and the like also may be used in addition or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
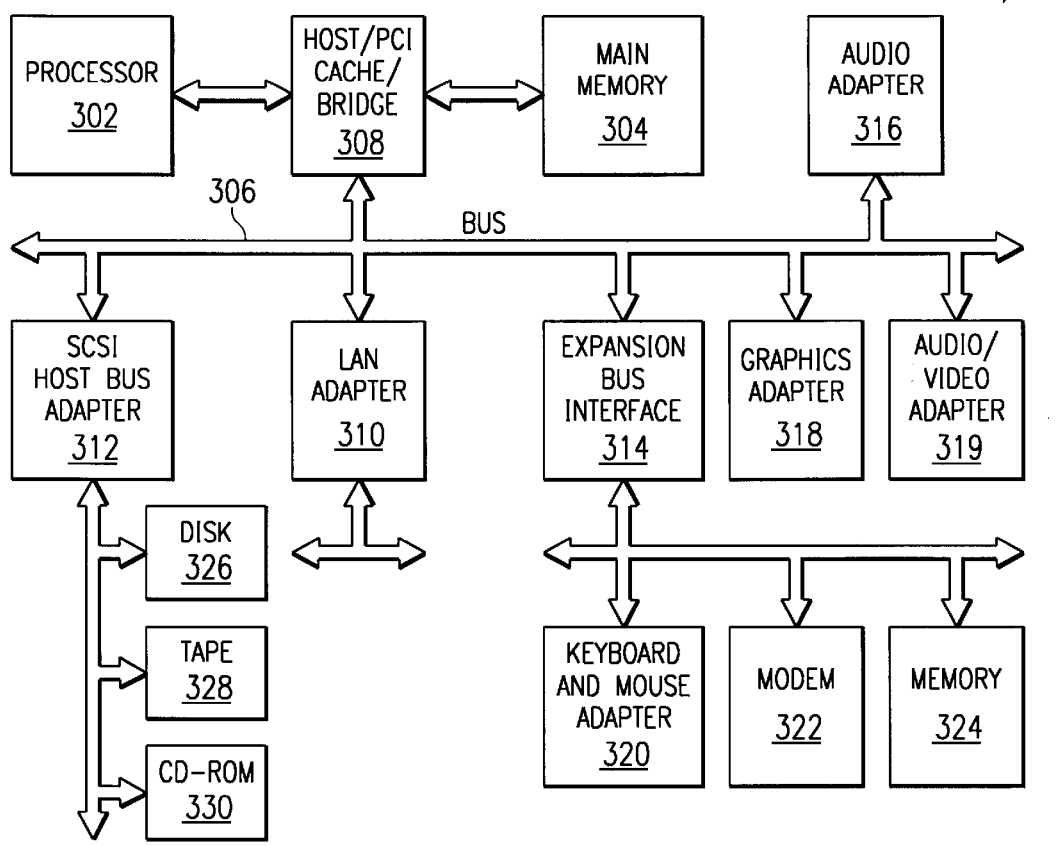
FIG. 3 is a block diagram of a data processing system in which the present invention may be implemented.

With reference now to FIG. 3, a block diagram of a data processing system in which the present invention may be implemented is illustrated. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM 330 in the depicted example. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of from International Business Machines Corporation. An object oriented programming system such as Java may run in conjunction with the operating system and provides calls to the operating system from Java programs or applications executing on data processing system 300. Instructions for the operating system, the object-oriented operating system, and applications or programs are located on storage devices, such as hard disk drive 326 and may be loaded into main memory 304 for execution by processor 302.

Those of ordinary skill in the art will appreciate that the hardware in FIG. 3 may vary depending on the implementation. For example, other peripheral devices, such as optical disk drives and the like may be used in addition to or in place of the hardware depicted in FIG. 3. The depicted example is not meant to imply architectural limitations with respect to the present invention. For example, the processes of the present invention may be applied to multiprocessor data processing system.

The present invention provides a method, apparatus, and instructions for managing a data stream, such as a metadata stream. The present invention provides a mechanism of effectively managing attribute calls in either the creation of the metadata stream or via a post processor to significantly reduce the overhead required to process the metadata stream. This reduction in overhead is especially important in a network and over the Internet. The present invention provides a mechanism that only updates attributes in the metadata stream on primitive calls. A primitive is a shape, such as a line, circle, character, curve, or polygon, that can be drawn, stored, and manipulated as a discrete entity by a graphics program. A primitive is one of the elements from which a large graphic design is created. A primitive call is a call to draw a primitive, such as, for example, draw polyline, draw arc, fill arc, draw box, fill box, and draw line. An attribute is used to set a characteristic for a primitive. An attribute may be, for example, color, mix modes, directions, view windows, line style, transforms, and current position.

Figure 4:
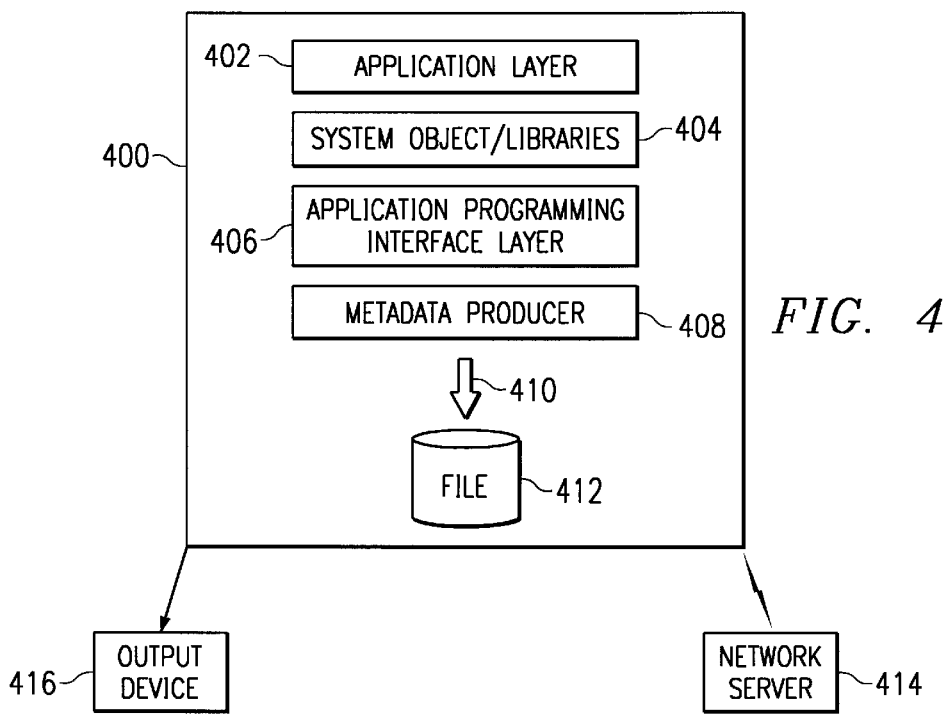
FIG. 4 is a block diagram of various components used in creating and managing metadata streams in accordance with a preferred embodiment of the present invention.

Turning now to FIG. 4, a block diagram of various components used in creating and managing metadata streams are illustrated in accordance with a preferred embodiment of the present invention. Data processing system 400 includes an application layer 402 that contains various objects and applications with which a user may interface. For example, an application within application layer 402 may be a spreadsheet application, word processing program or CAD program. The applications and objects within application layer 402 generate various attributes and primitive calls. System object/libraries 404 provides various functions that applications or objects within application layer 402 may call. For example, system object/libraries 404 may include code for generating and displaying scroll bar and list box objects so that this code does not need to be coded in an application within application layer 402. Application programming interface layer 406 receives calls either directly from application layer 402 or through system object/libraries 404. If an application within application layer 402 makes a call to system object/libraries 404, this layer will in turn make a call to application programming interface layer 406. Metadata producer 408, also referred to as a metafile producer, is code that supports application programming interface layer 406. For example, in Windows 95, the metadata producer would be a GDI system (DLL) library. In OS/2, the metadata producer is a PMGPI. Metadata producer 408 generates a metadata stream 410 that may be stored in a file 412 within data processing system 400 or sent to a server 414, which may be on a network, such as, for example, a local area network, the Internet, or an intranet. Metadata stream 410 also may be sent to an output device 416, such as, for example, a printer or display device. In the depicted example, metadata stream 410 may be sent directly to network server 414 or output device 416. Alternatively, metadata stream 410 may be first sent to file 412 and then to network server 414 or output device 416.

The depicted example in FIG. 4 is implemented in an operating system. This example, however, does not preclude the implementation of the processes of the present invention in other areas of a data processing system. The present invention may be implemented as a module outside of the operating system to process the metadata stream prior to the metadata stream being sent to an output device. For example, the module may be a print queue or a print spooler.

Figure 5:
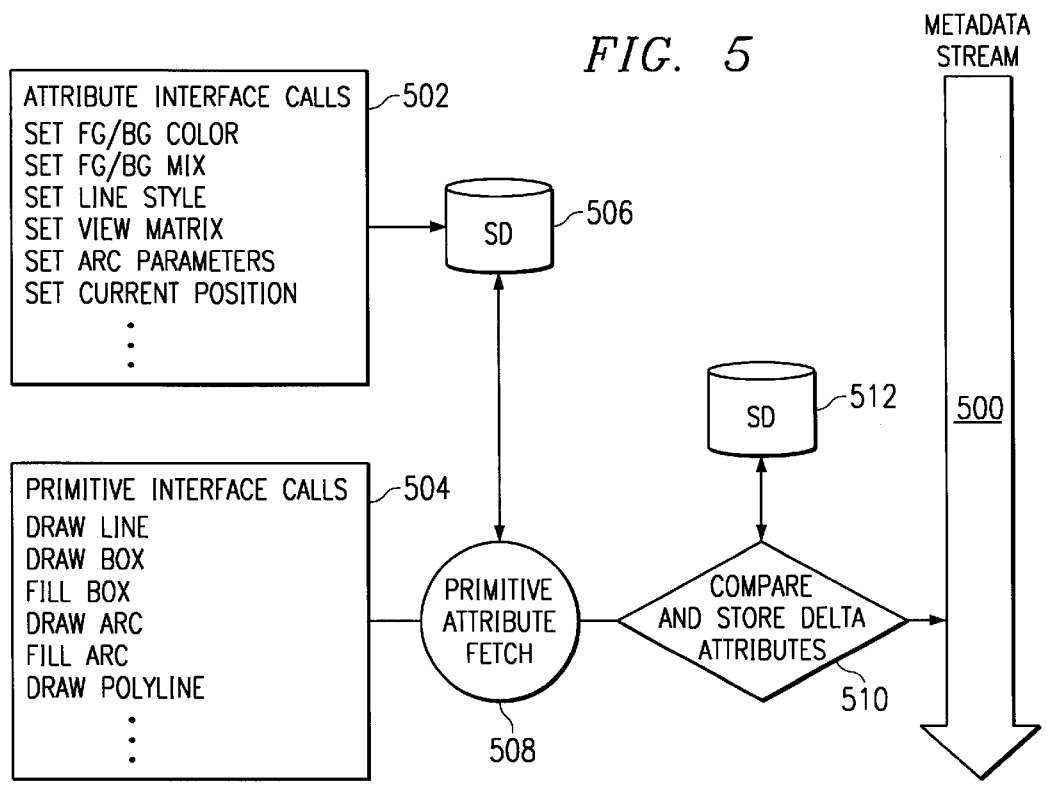
FIG. 5 is an illustration of the creation of a metadata stream in accordance with a preferred embodiment of the present invention.

With reference now to FIG. 5, an illustration of the creation of a metadata stream is depicted in accordance with a preferred embodiment of the present invention. Metadata stream 500 is created through various attribute interface calls 502 and primitive interface calls 504. Attribute interface calls may be made by either an application or an object within application layer 402 or by system object/libraries 404 to application programming interface layer 406 in FIG. 4. Attribute interface calls 502 are stored in storage device (SD) 506, which is a random access memory (RAM). Of course these attributes may be stored in other types of storage devices, such as a hard disk drive. Storage device 506 is used to track the current attributes set by the application or applications.

Primitive interface calls 504 results in a primitive attribute fetch in block 508 occurring. A primitive attribute fetch results in attributes, associated with primitive interface calls 504, being fetched from storage device 506 for the particular primitive interface call. The fetched attribute or attributes are compared in block 510 with any attribute stored within storage device (SD) 512 that are associated with the primitive interface call. In the depicted example, storage device 512 is a RAM. This storage device is used to store data describing the current attributes set within metadata stream 500. Any changes in attributes are stored in storage device 512 and the primitive interface calls with attributes are placed in metadata stream 500.

Figure 6:
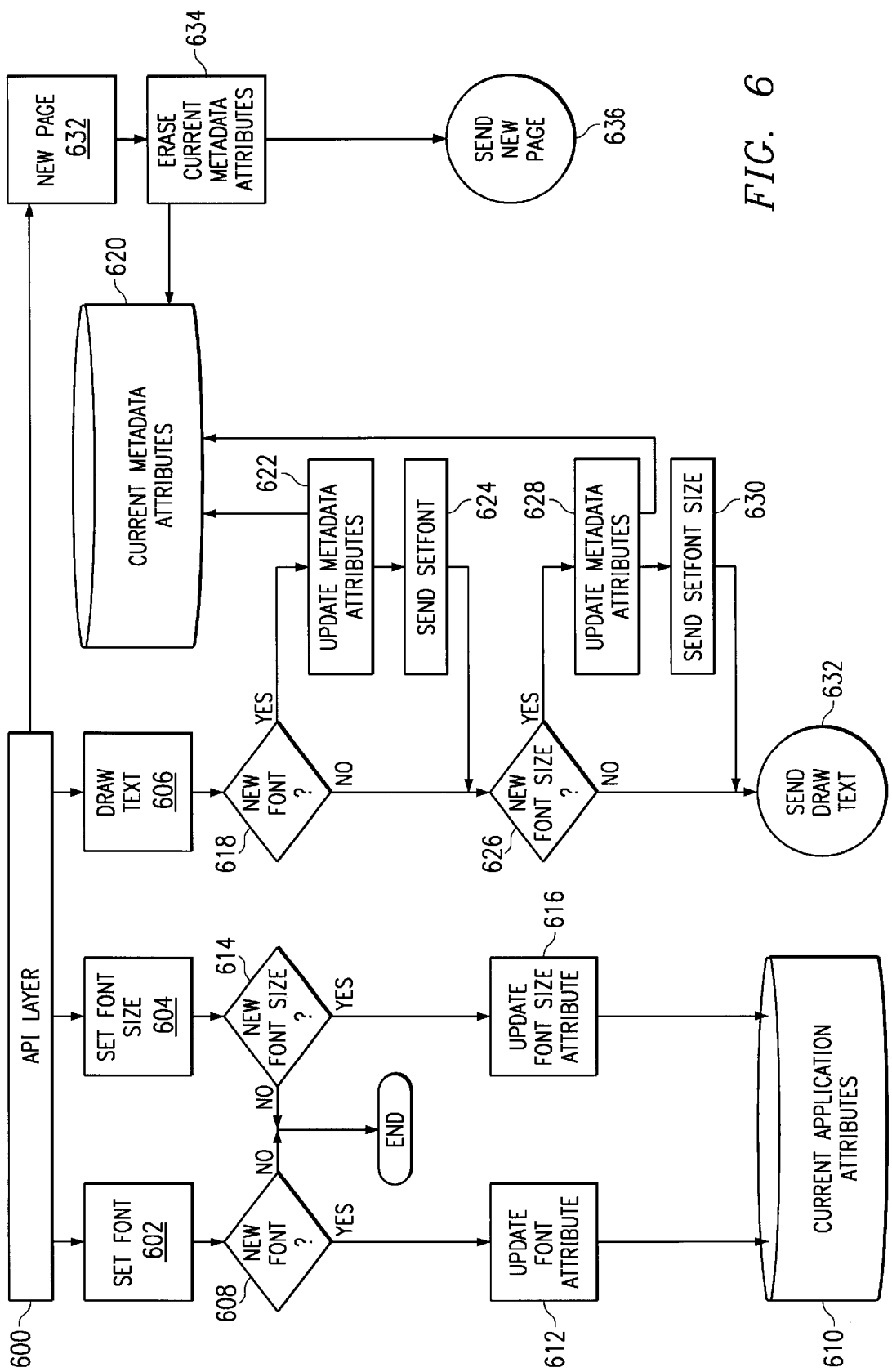
FIG. 6 is a data flow diagram of a process for creating a metadata stream in accordance with a preferred embodiment of the present invention.

With reference now to FIG. 6, a data flow diagram of a process for creating a metadata stream is depicted in accordance with a preferred embodiment of the present invention. Various calls to set attributes and calls to draw primitives are received from application programming interface layer 600. In the depicted example in FIG. 6, the attribute calls are received from API layer 600, such as, set font call 602 and set font size call 604. The primitive call, draw text call 606, is received from API layer 600. Set font call 602 results in a determination as to whether set font call 602 results in a new font attribute being set in block 608. This determination is used by querying a current application attributes database 610. Current application attributes database 610 may be stored in a storage device, such as storage device 506 in FIG. 5.

If a new font is present as a result of the set font call, a font attribute update is performed in block 612 to update the font attribute in current application attributes database 610. Otherwise, no action is taken and data flow terminates for this particular attribute call.

In response to set font size call 604 from API layer 600, a determination is made as to whether this call setting the font size results in a new font size in block 614. If a new font size occurs, the font size attribute is updated in block 616. If a new font size is not present, the data flow terminates for this particular call.

In response to draw text call 606, a determination is made as to whether a new font is to be drawn in block 618. Draw text call 606 is an example of a graphics primitive call, which is any call that causes an actual modification on the output device. This determination in block 618 is made by querying current application attributes database 610 for the font attribute and comparing that font to the font attribute stored in current metadata attributes database 620. Current application attribute database 610 is employed to track the attributes currently set by an application while current metadata attributes database 620 is used to track the attributes currently set within a metadata stream. If a new font is present in current application attributes database 610, current metadata attributes database 620 is updated in block 622. The update results in the attributes in current metadata attributes database 620 being updated to reflect the new font attribute for the primitive call, draw text call 606.

Thereafter, a set font is sent to the metadata stream (not shown) in block 624 and then a determination is made as to whether a new font size has been set in block 626. This determination is made by querying current application attributes database 610 for the font size attribute and comparing that with the font size attribute in current metadata attributes database 620. If a new font size is present, current metadata attributes database 620 is updated in block 628. Then, a send set font size is sent to the metadata stream in block 630. Thereafter, a send draw text is made to the metadata stream in block 632. If a new font or font size is not present when the attributes in current application attributes database 610 are compared to those in current metadata attributes database 620, the send draw text primitive is sent to the metadata stream in block 632 without sending a set font or set font size calls to the metadata stream.

Blocks 624, 630, and 632 result in metadata being placed within a metadata stream. Using this mechanism, metadata is not added to a metadata stream each time a set attribute call is made.

When a new page call 632 is received from API layer 600, current metadata attributes are erased in block 634. The current metadata attributes erased are those located within current metadata attributes database 620. Thereafter, in block 636, the new page call is placed in the metadata stream. In this manner, all of the attribute setting calls associated with a primitive call will be sent because they will all be new attribute setting calls as a result of the current metadata attributes being erased in response to the new page call. The processes described in FIGS. 5 and 6 may be implemented within metadata producer 408 in FIG. 4.

Figure 7:
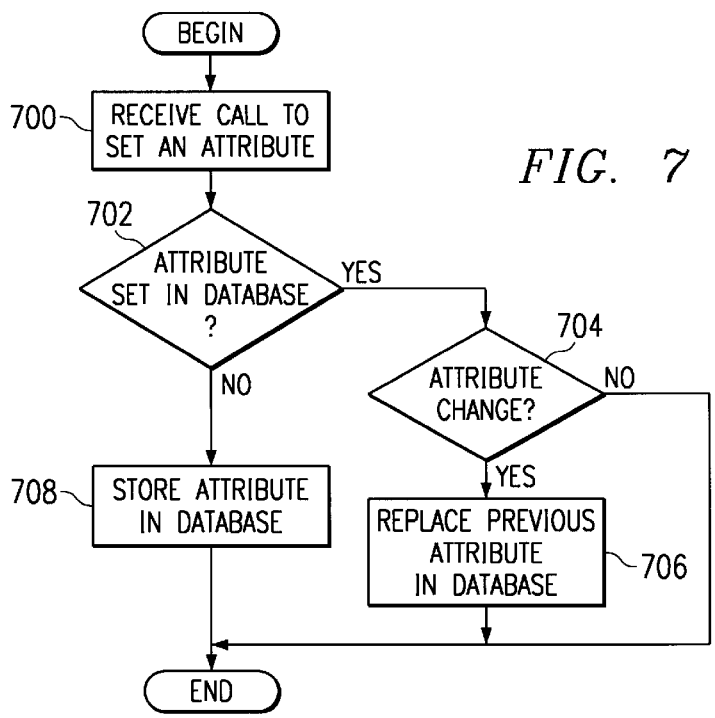
FIG. 7 is a flowchart of a process for tracking attribute setting calls from an application in accordance with a preferred embodiment of the present invention.

With reference now to FIG. 7, a flowchart of a process for tracking attribute setting calls made by an application is depicted in accordance with a preferred embodiment of the present invention. This process may be implemented within metadata producer 408 in FIG. 4 to track current application attributes. The process begins by receiving a call to set an attribute (step 700). A determination is made as to whether the attribute being set is present in the current application attribute database (step 702). If the attribute is present within this database, a determination is made as to whether the attribute has changed (step 704). This determination is used to identify a change in an attribute, such as, for example, a change of color for a primitive. If the attribute has changed, the attribute in the database is replaced with the new attribute (step 706) with the process terminating thereafter. Otherwise, the process terminates without changing the attribute in the database.

With reference now to step 702, if the attribute is currently not in the current application attributes database, the process then stores the attribute in the database (step 708) with the process terminating thereafter.

Figure 8:
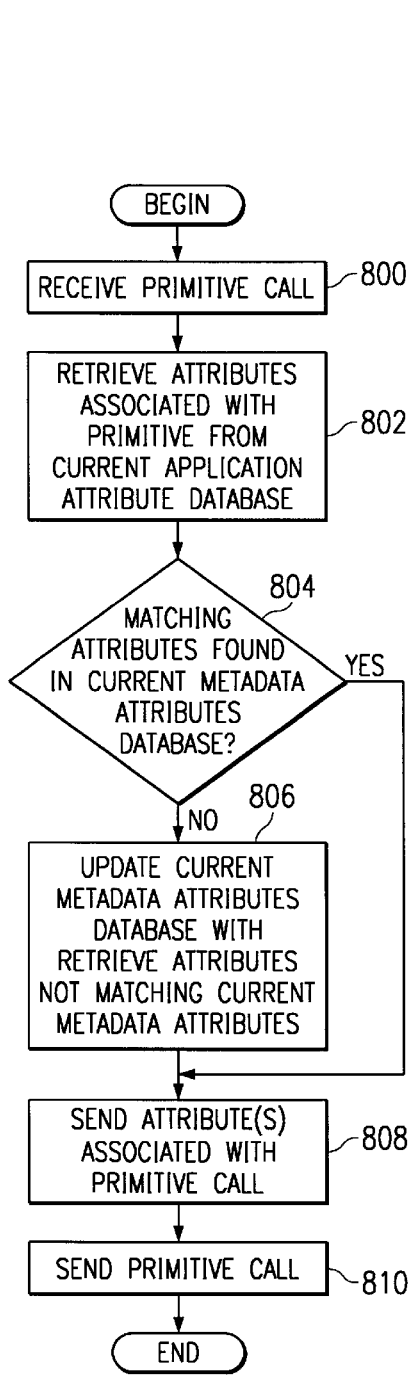
FIG. 8 is a flowchart of a process for generating a metadata stream in accordance with a preferred embodiment of the present invention.

Turning now to FIG. 8, a flowchart of a process for generating a metadata stream is depicted in accordance with a preferred embodiment of the present invention. The process begins by receiving a primitive call (step 800). In response to this call, a determination is made as to whether the primitive call is a new page call (step 802). If the primitive call is not a new page call, attributes associated with the primitive are retrieved from the current application attributes database (step 804). A determination is made as to whether these retrieved attributes match attributes found in the current metadata attributes database (step 806). The determination determines whether the attributes are present in the database and if the attributes are present, whether the attributes match each other. For example, for an arc primitive, arc parameters may be retrieved from the current application attributes database. These attributes are compared with attributes within the current metadata attributes database to determine whether these attributes are present in the metadata stream. If they are present, this step also determines whether the arc parameters set by the application are the same as those in the metadata stream as indicated in the current metadata attributes database.

If all of the attributes do not match, the current metadata attributes database is updated with attributes retrieved from the current application attributes database that did not match those within the current metadata attributes database (step 808). Thereafter, the updated attributes associated with the primitive call to draw the primitive are placed in the metadata stream (step 810). The attributes that match those in the current metadata attributes database are not sent. Then, the primitive call is placed into the metadata stream (step 812) with the process terminating thereafter.

With reference now to step 806, if all of the retrieved attributes match the attributes found in the current metadata attributes database, the process proceeds directly to step 812 without placing any attribute setting calls in the metadata stream.

With reference again to step 802, if the primitive call is a new page call, the current metadata attributes within the current metadata attributes database are erased (step 814).

Figure 9:
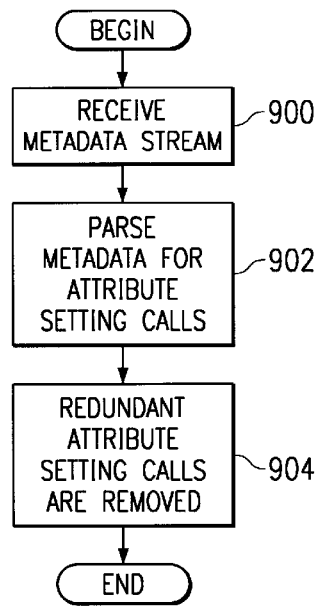
FIG. 9 is a flowchart of a process for processing a metadata stream in accordance with a preferred embodiment of the present invention.

With reference now to FIG. 9, a flowchart of a process for processing a metadata stream is depicted in accordance with a preferred embodiment of the present invention. The process begins by receiving a metadata stream (step 900). The metadata stream is parsed for redundant attribute setting calls (step 902). Redundant attribute setting calls are removed from the metadata stream (step 904) with the process terminating thereafter. In removing redundant attribute calls in the depicted example, only attribute calls associated with primitives are removed from the metadata stream when the processing is directed towards graphics.

Figure 10:
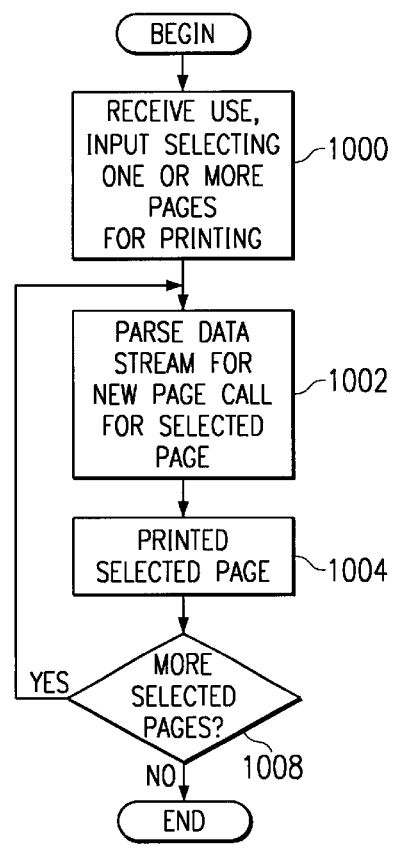
FIG. 10 is a flowchart of a process for printing a metadata stream in accordance with a preferred embodiment of the present invention.

With reference next to FIG. 10, a flowchart of a process for printing a metadata stream is depicted in accordance with a preferred embodiment of the present invention. The process begins by receiving user input selecting one or more pages for printing (step 1000). This selection of pages involve a display of selected frames or pages on a display or a selection of pages to be printed on an output device, such as a laser printer. The metadata stream is parsed until a new page call for a selected page is encountered (step 1002). Of course some other marker other than a new page call may be used to identify different sections or pages within a metadata stream. Upon encountering a new page call identifying a page selected for printing, the page is then printed using the attributes and other formatting data found within the data of the selected page within the metadata stream (step 1004). Using the processes of the present invention, all of the format information needed to properly print a page is found in the portion of the metadata stream between the new page call for the selected page and a new page call for a page subsequent to the selected page.

A determination is made as to whether additional pages are present for printing (step 1006). If additional pages are present, the process then returns to step 1002 to find the next page that is to be printed. Otherwise, the process terminates.

Figure 11A:
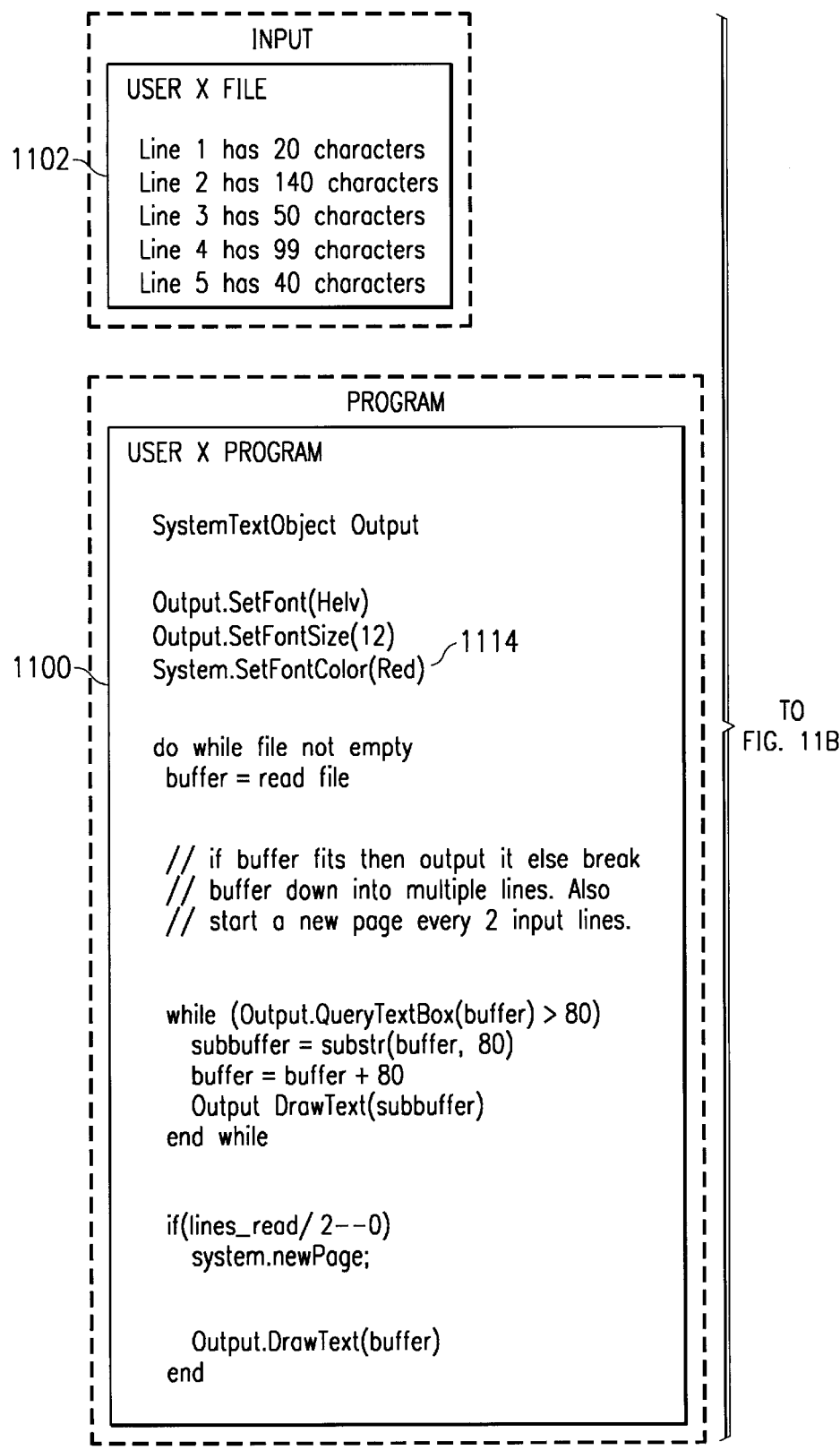
FIG. 11 is a diagram of pseudo code and data in a metadata stream in accordance with a preferred embodiment of the present invention.
Figure 11B:
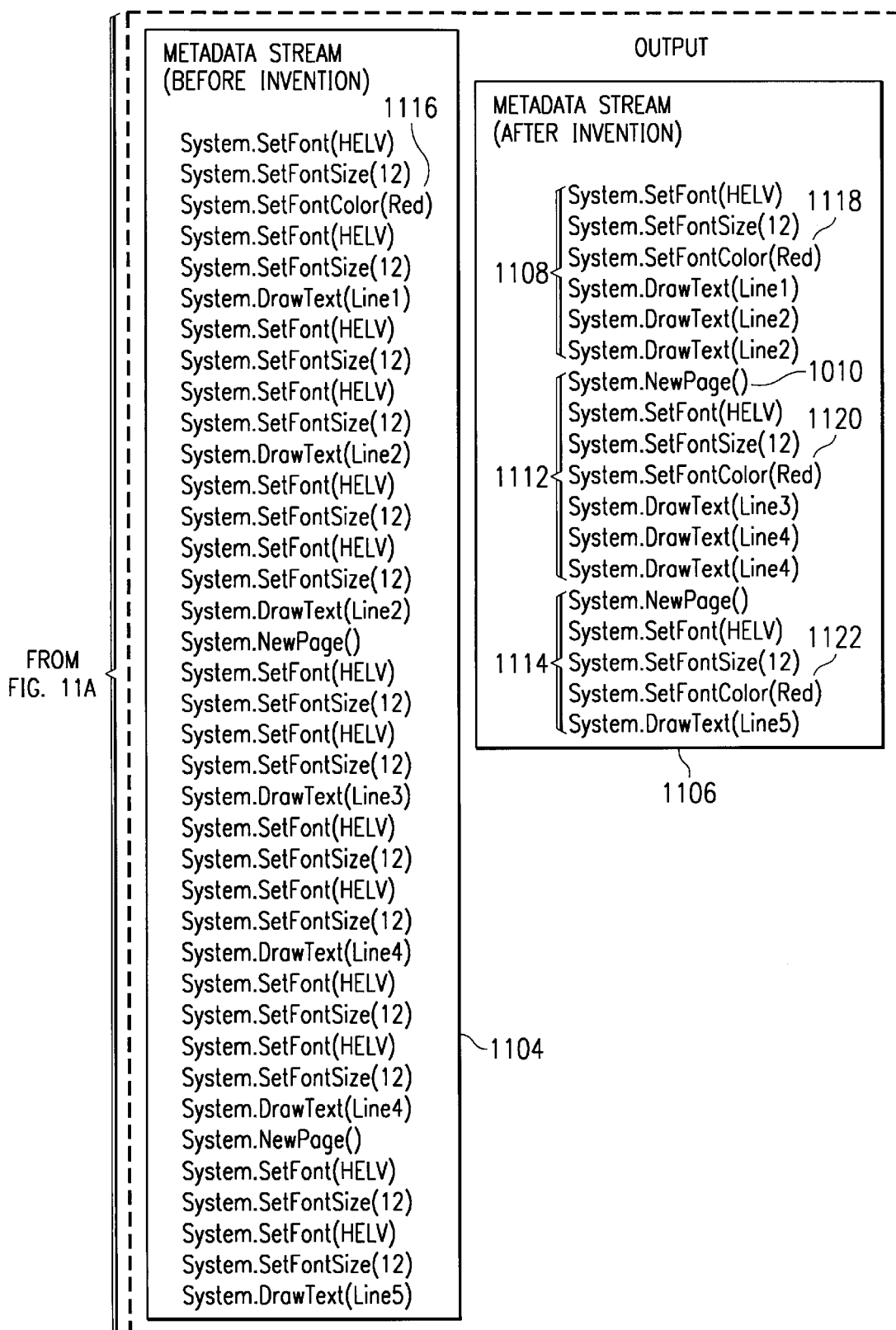

Turning now to FIG. 11, a diagram of pseudo code and data in a metadata stream is depicted in accordance with a preferred embodiment of the present invention. This figure illustrates how the processes of the present invention will alter and compact a metadata stream. Program 1100 in this example is a user program that may be a program or object within application layer 402 in FIG. 4. In response to input 1102, program 1100 normally generates metadata stream 1104. When the processes of the present invention are applied in handling attribute and primitive calls, which include new page calls, from program 1100, a metadata stream 1106 is generated. Metadata stream 1106 allows for a user to print a single page without having to parse the entire metadata stream from page one to the page that is to be printed to determine the current attributes that apply to the page selected for printing. As can be seen, using the processes of the present invention, metadata stream 1106 contains all the necessary attribute settings within each page. For example, in section 1108 of metadata stream 1106, the various attributes necessary to print the page are found in section 1108. When a new page call 1110 is made in section 1112 of metadata stream 1106, the necessary attribute settings for printing the page are found within section 1108. For example, the font type and font size attributes are set within section 1112 of metadata stream 1106. Similarly, the font type and size are set within section 1108 of metadata stream 1106 and within section 1112 within metadata stream 1106. Another example involves System SetFontColor(Red)call 1114 made in program 1100. Normally, this call shows up only once early in metadata stream 1104 as can be seen by System SetFontColor(Red)1116. Using the processes of the present invention, this call occurs in each of the pages as can be seen by System SetFontColor(Red) 1118, 1120, and 1122.

Thus, with the processes of the present invention, a page may be printed by finding the need page call associated with the page selected printing and then printing the page using the attributes settings and other calls found after the new page call and prior to a subsequent new page call. In this manner, printing selected pages in a document or printing pages in a reverse order within a document may be accomplished without having to process the metadata stream to the page or pages selected for printing. The processes are applicable to both pages printed by a printer or some other output device as well as pages or frames displayed in display devices. For example, the processes of the present invention may be used in display sections, such as frames, in an application on a display device.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention the practical application and to enable others of ordinary skill in the art to understand the invention for various embodiments with various modifications as are suited to the particular use contemplated.

What is claimed is:

1. A method in a data processing system for generating a metadata stream, the method comprising the data processing system implemented step of:

receiving calls from an application, wherein the calls are received calls;

tracking current application attributes in the received calls;

identifying a new section call in the received calls;

placing the new section call within the metadata stream to identify a new section in the metadata stream; and placing current application attributes in the metadata stream within the new section identified by the new section call, wherein the new section within the metadata stream may be printed using the current application attributes located within new section.

2. The method of claim 1, wherein the new section is located between the new section call for the new section and a new section call for a section immediately following the new section.

3. The method of claim 1, wherein the new section call is a new page call and wherein the new section is a new page.

4. A data processing system for generating a metadata stream, the data processing system comprising:

reception means for receiving calls from an application, wherein the calls are received calls;

tracking means for tracking current application attributes in the received calls;

identification means for identifying a new section call in the received calls;

first placement means for placing the new section call within the metadata stream to identify a new section in the metadata stream; and second placement means for placing current application attributes in the metadata stream within the new section identified by the new section call, wherein the new section within the metadata stream may be printed using the current application attributes located within new section.

5. The data processing system of claim 4, wherein the new section is located between the new section call for the new section and a new section call for a section immediately following the new section.

6. The data processing system of claim 4, wherein the new section call is a new page call and wherein the new section is a new page.

7. A computer program product in a computer readable medium for generating a metadata stream, the computer program product comprising:

first instructions for receiving calls from an application, wherein the calls are received calls;

second instructions for tracking current application attributes in the received calls;

third instructions for identifying a new page call in the received calls;

fourth instructions for placing the new page call within the metadata stream to identify a new page in the metadata stream; and fifth instructions for placing current application attributes in the metadata stream within the new page identified by the new page call, wherein the new page within the metadata stream may be printed using the current application attributes located within new page, wherein the instructions are embodied within the computer readable medium.

* * * * *